United States Patent

Schwerdhoefer

[15] 3,701,333
[45] Oct. 31, 1972

[54] GEAR SHIFTING MECHANISM FOR A BICYCLE TRANSMISSION

[72] Inventor: Hans Joachim Schwerdhoefer, Schweinfurt on Main, Germany

[73] Assignee: Fichtel & Sachs AG, Schweinfurt am Main, Germany

[22] Filed: Aug. 25, 1971

[21] Appl. No.: 174,790

[30] Foreign Application Priority Data

Sept. 1, 1970 Germany..........P 20 43 225.1

[52] U.S. Cl..................................116/124 R, 74/523
[51] Int. Cl.................................................G09f 9/00
[58] Field of Search....74/523, 473 C, 488, 489, 491; 116/114 R, 124 R, DIG. 20

[56] References Cited

UNITED STATES PATENTS 3,554,156  1/1971  Kishida et al..............116/114
3,554,158  1/1971  Shimano et al............116/114

*Primary Examiner*—Milton Kaufman
*Attorney*—Kelman and Berman

[57] ABSTRACT

The gear shifting lever for a multiple-speed hub in a bicycle is attached to the bicycle frame by two clamping plates which are connected by screws, and of which one carries the support for the lever. The support and the clamping members are covered by a housing having a viewing aperture for sequential display of indicia indicating the transmission ratio as the lever is pivoted, the indicia being arranged on a carrier coupled to the leer and guided between one of the clamping plates and the housing.

9 Claims, 5 Drawing Figures

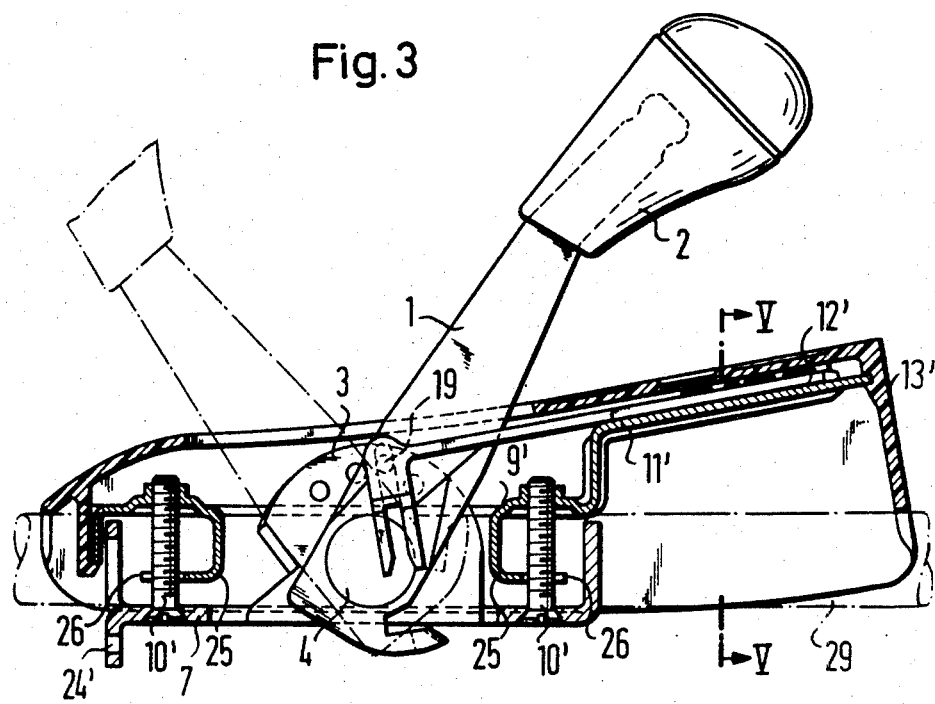
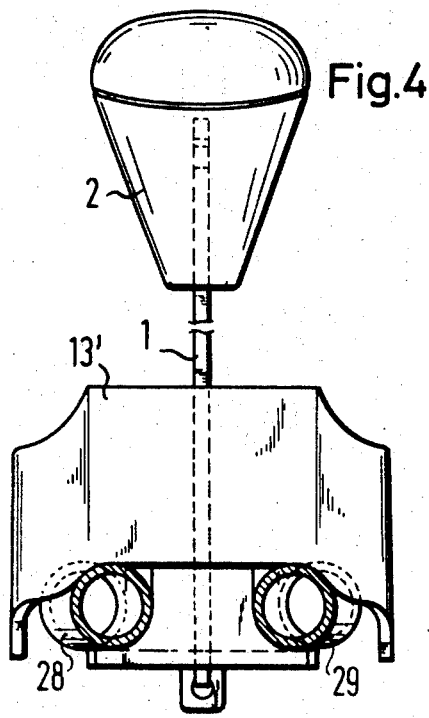
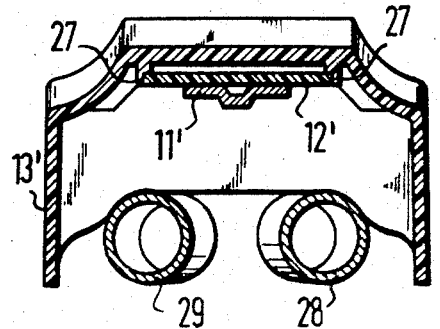

GEAR SHIFTING MECHANISM FOR A BICYCLE TRANSMISSION

This invention relates to an actuating mechanism for elements of a bicycle and like vehicle having a tubular frame, and will be described hereinafter with reference to a frame-mounted shifting mechanism for a bicycle having multiple transmission ratios between the pedals and the rear wheel.

It is known to provide a bicycle with an actuating mechanism having an operating lever which is pivoted to change the transmission ratio of the bicycle drive, and an indicating arrangement which displays indicia representative of the set transmission ratio. The known devices are relatively complex and correspondingly costly. The range of movement of the indicia during gear shifting is quite small, and the indicia must be made small, and therefore difficult to read, if not more than one of them is to be visible through a display window in a housing covering much of the mechanism.

It is a primary object of this invention to provide an actuating mechanism of the type described which consists of very few parts, is therefore simple and inexpensive to build, yet permits the use of large and easily readable indicia for indicating the set transmission ratio.

Another object is the provision of an actuating mechanism which may be pre-assembled and mounted on the vehicle frame without requiring disassembly.

With these and other objects in view, the actuating mechanism of the invention includes an operating lever pivotally mounted on a support and a clamping device for clamping the support to a tubular vehicle frame. The clamping device includes two clamping members and fastening means which connect the members for relative movement. A carrier for indicia is coupled to the lever for translatory movement in sliding engagement with one of the clamping members when the lever is pivoted, the lever and the carrier being provided with respective fixedly attached, engaged coupling elements, and the indicia being offset on the carrier in the direction of translatory movement. A housing substantially completely covers the support, the clamping device, the carrier, and the coupling elements, but has a viewing aperture which sequentially displays the indicia during the simultaneous movement of the lever and the carrier, the lever projecting from the housing.

Other features, additional objects, and many of the attendant advantages of this invention will readily become apparent from the following detailed description of preferred embodiments when considered in connection with the appended drawing in which:

FIG. 3 shows a second embodiment of the invention in a view corresponding to that of FIG. 1;

FIG. 4 illustrates the device of FIG. 3 in front elevation; and

FIG. 5 is a section of the device of FIG. 3 on the line V—V.

Figure 1:
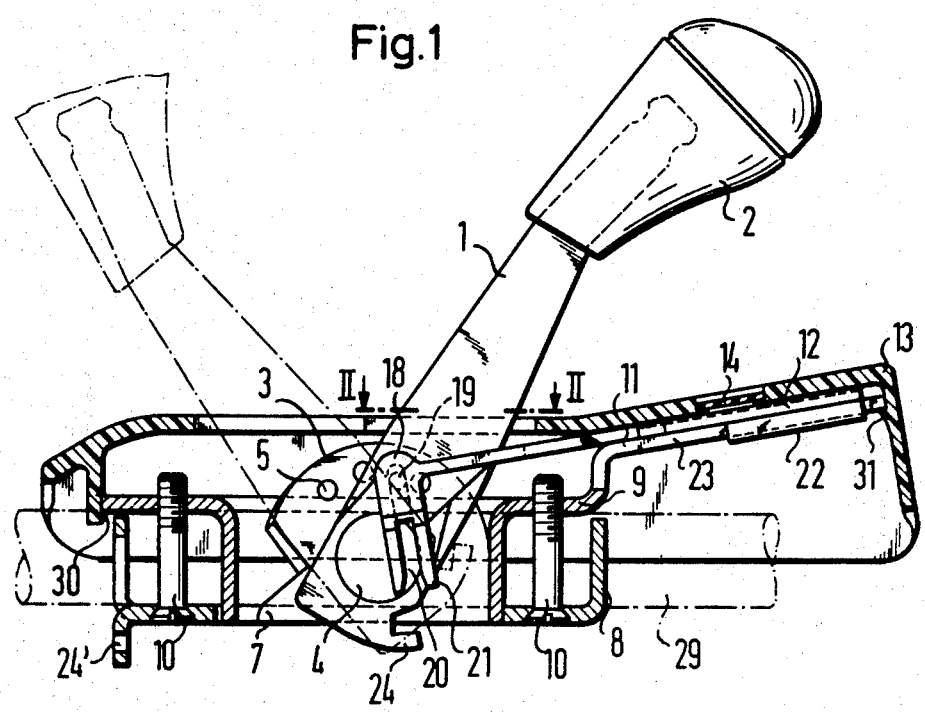
FIG. 1 shows a frame-mounted gear shift actuating mechanism of the invention in side-elevational section.
Figure 2:
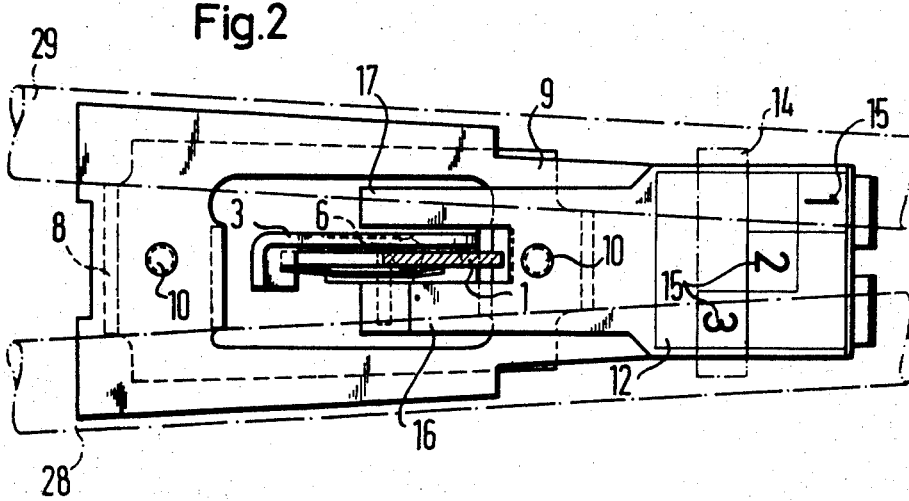
FIG. 2 shows the mechanism of FIG. 1 without its housing in top plan view and partly in section on the line II—II.

Referring now to the drawing in detail, and initially to FIGS. 1 and 2, there is seen a gear shift actuating mechanism for a bicycle having a multiple-speed hub, only the two horizontal, tubular top bars 28, 29 of the bicycle frame being shown in phantom view.

The operating lever 1 of the mechanism carries a rubber knob 2 on the upper free end of its longer arm and is mounted on an upright support plate 3 by means of a stub shaft 4. The lever 1 is releasably held in the three angular positions corresponding to the transmission ratios of the non-illustrated hub by a click-stop arrangement consisting of axial bores 5 spaced along a circle about the pivot axis of the lever 1, and a spring loaded steel ball 6 on the lever 1.

The support plate 3 is fixedly attached to an apertured clamping plate 7 which abuts from below against the bars 28, 29. Lugs 8 integral with the plate 7 project perpendicularly from the same for laterally securing the plate relative to the bars 28, 29. Another apertured clamping plate 9 having similar lugs is held against the top surfaces of the bars 28, 29 by two partly threaded screws 10 whose heads abuttingly engage the plate 7 and whose threaded portions are received in threaded bores of the plate 9.

An integral portion 11 of the plate 9 extends obliquely forward and upward from the clamping part of the plate, and its flat top surface is slidably engaged by an elongated, flat indicia carrier 12 coupled to the lever 1. Except for the end of the lever 1 carrying the knob 2, the actuating mechanism is covered in an upward direction and both lateral directions by a housing 13 of somewhat resilient plastic. Internal ridges 30, 31 are snapped over the front and rear edges of the clamping plate 9 to hold the housing in position.

The top wall of the housing 13 extends spacedly parallel to the portion 11 of the plate 9 so that the carrier 12 is movably confined between the plate portion 11 and the housing wall. A window 14 closes an aperture in the housing 13 through which indicia 15 on the carrier 12 are displayed when the carrier moves longitudinally of the bars 28, 29. As is best seen in FIG. 2, in which the window 14 is indicated in phantom view, the indicia 15 which represent the transmission ratios by arabic numerals 1, 2, 3 are offset both in the direction of movement of the carrier 12 and at right angles to that direction. The window 14 is elongated transversely to the direction of carrier movement so that the transmission ratio is indicated not only by the shape of the indicia, but also by their position in the window 14. The configuration of the indicia thus is not in itself critical.

The rear portion of the carrier 12 is bifurcated, and the slot separating the two tongue-shaped end portions 16, 17 receives the support plate 3 and the lever 1. The end portion 17 assists in guiding the carrier 12 by engagement with the support plate 3. The end portion 16 carries a receptacle 18 integrally molded from thermoplastic synthetic resin composition with the carrier 12. Two walls 21 of the receptacle 18 are perpendicular to the flat portion of the carrier 12, and are separated by an elongated slot 20 receiving a pin 19 which projects axially from the lever 1. The engaged receptacle 18 and pin 19 couple the carrier 12 to the lever 1 for translatory movement of the carrier in sliding engagement with the portion 11 of the clamping plate 9 when the lever 1 is pivoted about the axis of the stub shaft 4.

The carrier 12 is additionally guided on the plate portion 11 by an integrally molded rib 22 movably received in a guide slot 23 of the plate portion 11. The lever 1, when ultimately installed, is connected with the driven wheel of the bicycle by a Bowden cable in a manner known in itself, one end of the wire in the cable being attached to a hook 24 on the shorter arm of the lever 1 and passing through an opening 24' in a dependent lug of the clamping plate 7.

The operation of the actuating mechanism illustrated in FIGS. 1 and 2 will be obvious from the preceding description of its structure. As the lever 1 is pivoted between the three angular positions defined by the click-stop arrangement 5, 6, the hook 24 moves the non-illustrated Bowden cable, thereby changing the transmission ratio of the multiple-speed hub (not shown). The translatory movement of the carrier 12 caused by angular and linear movement of the pin 19 in the slot 20 makes the indicia 15 appear in the window 14.

When the actuating mechanism is preassembled as shown in FIG. 1, and it is intended to mount it on the bars 28, 29, the knob 2 is removed from the lever 1, the screws 10 are disengaged from the clamping plate 9, and the plate 7 together with the support plate 3 and the lever 1 is removed downwardly from the housing 13 which retains the upper clamping plate 9 and the indicia carrier 12, the pin 19 slipping from the slot 20. The housing 13 and associated elements are then placed on the bars 28, 29 from above, the clamping plate 7 is moved from below against the bars, and the screws 10 are tightened to clamp the plates 7, 9 tightly on the bicycle frame, care being taken to engage the pin 19 with the receptacle 18 during the mounting operation.

As is shown in FIG. 2, the bars 28, 29 converge in a forward direction, and it would be possible to insert the assembled mechanism between the bars where they are farthest apart near their rear ends, and then to shift the mechanism into its illustrated position if the clamping plates 7, 9 could be spaced apart sufficiently by loosening the screws 10. The screws, however, are too short, and cannot be made significantly longer without increasing the overall height of the mechanism in an undesirable manner.

The modified actuating mechanism illustrated in FIGS. 3 to 5 does not have to be disassembled for mounting it on a bicycle frame. It differs from the first-described embodiment only in those elements which will be described specifically hereinbelow and operates in the same manner. Elements closely similar to, but not identical with those of the first-described device are indicated by primed reference numerals.

The top clamping plate 9' is provided with two integral, approximately L-shaped lugs 25 extending toward the bottom clamping plate. A radially open bore 26 near the free end of each lug has internal threads about an axis common to corresponding threads in an aligned bore in the main portion of the clamping plate 9'. Fully threaded screws 10' simultaneously engage the threads in both bores in the assembled mechanism, and their heads abut against the plate 7.

The portion 11' of the plate 9' whose oblique top face engages the indicia carrier 12' is provided with a groove and a corresponding rib on its opposite face for greater rigidity, but does not laterally guide the indicia carrier 12' which therefore does not have a guide rib. It is laterally confined between guide faces 27 of the housing 13'.

When the pre-assembled mechanism shown in FIGS. 3 to 5 is to be mounted on the bars 28, 29, the screws 10' are loosened until their ends threadedly engage the bores 26 only, thereby dropping the bottom plate 7 sufficiently to permit the mechanism to be introduced between the widely spaced portions of the bars 28, 29 and slid into position longitudinally of the bars, whereupon the screws 10' are tightened, no actual disassembly of the mechanism being required.

It is a common feature of both illustrated and described embodiments of the invention that they consist of four steel plates 1, 3, 7, 9 readily shaped by stamping and two injection-molded plastic elements 12, 13 in addition to simple parts 2, 4, 6 etc. which are staple articles of commerce. The actuating mechanism of the invention thus may be produced at very low cost.

While the mechanism of the invention has been described in its cooperation with a multiple-speed gear transmission in the rear hub of a bicycle, it can be employed in an obvious manner with other multiple-speed transmissions operated by means of a Bowden cable or a similar motion transmitting device, and it may be used for operating elements of a bicycle or like vehicle other than a multiple-speed transmission, its use for operating a brake being specifically contemplated.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. An actuating mechanism for a bicycle and like vehicle comprising, in combination:
   a. a support;
   b. an operating lever mounted on said support for pivoting movement about an axis;
   c. clamping means secured to said support for clamping the same to a tubular vehicle frame, said clamping means including
      1. two clamping members adapted to receive a portion of said frame therebetween, and
      2. fastening means connecting said members for relative movement;
   d. a carrier member;
   e. coupling means coupling said carrier member to said lever for translatory movement of the carrier member in sliding engagement with one of said clamping members when said lever pivots about said axis, said coupling means including two movably engaged coupling elements fixedly fastened to said lever and to said carrier member respectively;
   f. a plurality of indicia offset on said carrier member in the direction of said translatory movement, and
   g. a housing substantially covering said support, said clamping means, said carrier member, and said coupling means,
      1. said housing being formed with a viewing aperture sequentially displaying said indicia during said movement of the carrier member,
      2. said lever projecting from said housing.

2. A mechanism as set forth in claim 1, further comprising cooperating guide means on said one clamping member and on said carrier member, one of the two last-mentioned members being formed with a recess elongated in the direction of said translatory movement, the other member carrying a projection engaging said elongated recess.

3. A mechanism as set forth in claim 1, wherein said carrier member is formed with a slot elongated in the direction of said translatory movement, said slot separating two tongue portions of said carrier member, one of said tongue portions carrying one of said coupling members.

4. A mechanism as set forth in claim 3, wherein said one coupling member is a receptacle, and the other coupling member is received in said receptacle for angular movement about an axis spacedly parallel to the pivot axis of said lever.

5. A mechanism as set forth in claim 4, wherein said receptacle is formed with a slot therein radial relative to said axis of angular movement and movably receiving said other coupling member.

6. A mechanism as set forth in claim 1, wherein said indicia are offset on said carrier member transversely to said direction of translatory movement.

7. A mechanism as set forth in claim 1, wherein said clamping means further comprise two lugs extending from said one clamping member toward the other clamping member, each lug and said one clamping member being formed with bores internally threaded about a common axis, and said fastening means including two screws, each screw engaging said other clamping member and being threadedly received simultaneously in said bores in an associated lug and in said one clamping member.

8. A mechanism as set forth in claim 7, wherein said bores in said lugs are open radially relative to said common axis.

9. A mechanism as set forth in claim 1, wherein said housing has two guide faces parallel to said direction of translatory movement and guidingly engaging said carrier member.

* * * * *